US008822572B2

(12) United States Patent
Hain et al.

(10) Patent No.: US 8,822,572 B2
(45) Date of Patent: Sep. 2, 2014

(54) PROCESS FOR CONTINUOUS EMULSION POLYMERIZATION

(75) Inventors: Jessica Hain, Zangberg (DE); Udo Kotschi, Burghausen (DE); Hans-Peter Weitzel, Reischach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/505,921

(22) PCT Filed: Jul. 7, 2011

(86) PCT No.: PCT/EP2011/061544
§ 371 (c)(1), (2), (4) Date: Jul. 12, 2012

(87) PCT Pub. No.: WO2012/007356
PCT Pub. Date: Jan. 19, 2012

(65) Prior Publication Data

US 2013/0102702 A1 Apr. 25, 2013

(30) Foreign Application Priority Data

Jul. 14, 2010 (DE) ......................... 10 2010 031 339

(51) Int. Cl.
*C08F 2/22* (2006.01)

(52) U.S. Cl.
USPC ............................ 523/402; 524/832; 524/503

(58) Field of Classification Search
None
See application file for complete search history.

(56) References Cited

U.S. PATENT DOCUMENTS

| | | | | |
|---|---|---|---|---|
| 3,729,438 | A | 4/1973 | Plesich | |
| 4,035,329 | A | 7/1977 | Wiest et al. | |
| 4,164,489 | A * | 8/1979 | Daniels et al. | 524/733 |
| 5,576,384 | A | 11/1996 | Nölken et al. | |
| 5,708,077 | A | 1/1998 | Nölken et al. | |
| 6,245,851 | B1 | 6/2001 | Petrocelli et al. | |
| 6,664,322 | B2 * | 12/2003 | Weitzel | 524/459 |
| 8,153,735 | B2 * | 4/2012 | Weitzel et al. | 526/65 |
| 2002/0007009 | A1 | 1/2002 | Stark et al. | |
| 2002/0035192 | A1 | 3/2002 | Weitzel | |
| 2003/0114583 | A1 | 6/2003 | Stark et al. | |
| 2003/0125451 | A1 | 7/2003 | Weitzel et al. | |
| 2008/0214722 | A1 | 9/2008 | Petri et al. | |
| 2008/0312477 | A1 | 12/2008 | Raichle et al. | |
| 2009/0069495 | A1 | 3/2009 | Fichtner et al. | |
| 2009/0203832 | A1 | 8/2009 | Muller et al. | |

FOREIGN PATENT DOCUMENTS

| | | |
|---|---|---|
| DE | 2 148 457 | 4/1973 |
| DE | 2 148 458 | 4/1973 |
| DE | 24 56 576 | 8/1976 |
| DE | 10 2007 028 332 | 12/2008 |
| EP | 0 005 073 | 10/1979 |
| EP | 0 327 006 | 8/1989 |
| EP | 0 327 376 | 8/1989 |
| EP | 0 612 771 | 8/1994 |
| EP | 1 067 147 | 1/2001 |
| EP | 1 153 979 | 11/2001 |
| EP | 1 174 445 | 1/2002 |
| EP | 1 308 468 | 5/2003 |
| EP | 1 323 752 | 7/2003 |
| EP | 2 017 313 | 1/2009 |
| EP | 2 088 162 | 8/2009 |
| EP | 2 166 050 | 3/2010 |
| GB | 1 407 827 | 9/1975 |
| WO | WO 2006/111290 | 10/2006 |

OTHER PUBLICATIONS

Petrocelli, Francis P., Continuous Process of the Production of Vinyl Acetate-Ethylene Emulsion Copolymers, Polym. Sci. Eng., 80, p. 544-545 (1999).
Fox T. G., Bull. Am. Physics Soc. 1, 3, p. 123 (1956).
Polymer Handbook 2nd Edition, J. Wiley & Sons, New York (1975).
Report of FATIPEC Congress, Brussles, Jun. 10-14, 1996, vol. D, p. 67-88.

* cited by examiner

*Primary Examiner* — Robert S Loewe
(74) *Attorney, Agent, or Firm* — RatnerPrestia

(57) ABSTRACT

A process for aqueous, free-radically initiated, continuous emulsion polymerization of A) at least one vinyl ester and optionally at least one (meth)acrylic ester, B) ethylene, and C) 0 to 10% by weight of one or more ethylenically unsaturated, functionalized comonomers, in the presence of 3.0 to 12.5% by weight of one or more emulsifiers, where at least 50% by weight are nonionic emulsifiers, and 0 to 10% by weight of one or more protective colloids, in a stirred tank cascade with at least two pressure reactors connected in series and with at least one low-pressure reactor connected downstream.

15 Claims, No Drawings

PROCESS FOR CONTINUOUS EMULSION POLYMERIZATION

CROSS REFERENCE TO RELATED APPLICATIONS

This application is the national phase filing of international patent application No. PCT/EP2011/061544, filed 7 Jul. 2011, and claims priority of German patent application number 10 2010 031 339.4, filed 14 Jul. 2010, the entireties of which applications are incorporated herein by reference.

FIELD OF THE INVENTION

The invention relates to a process for the aqueous, radically initiated, continuous emulsion polymerization of vinyl esters, ethylene, and optionally further ethylenically unsaturated, functionalized monomers and to the use of the polymer dispersions obtained thereby as binders for coating materials and paints.

BACKGROUND OF THE INVENTION

From the prior art it is known that functional monomers, such as hydrolyzable vinylsilanes, for example, help to improve the properties of polymer dispersions when used as binders in paints.

U.S. Pat. No. 3,729,438 describes lattices based on vinyl acetate-vinylsilane copolymers with a vinylsilane fraction of 0.5% to 1.0%. The lattices are prepared in a discontinuous emulsion polymerization process, in the presence of nonionic or anionic emulsifier, preferably of mixtures of nonionic and anionic emulsifiers.

DE-A 2148457 describes a process for preparing polymer dispersions containing silanol groups, with sharply improved wet adhesion of the architectural coating materials of the invention. DE-A 2148458 describes a process for preparing vinyl acetate-vinylsilane copolymers in a discontinuous emulsion polymerization process, in the presence of anionic, cationic and/or nonionic emulsifiers and/or protective colloids.

EP 0327006 A2 discloses copolymer dispersions containing 0.05%-2% by weight of monomer units of unsaturated hydrolyzable organic silicon compounds, which find application in low-emission emulsion paints, coating materials or dispersion renders. The aqueous dispersion is stabilized using hydroxyethylcellulose, nonionic emulsifier, and vinylsulfonate.

EP 327376 A2 describes vinyl ester copolymers with a vinylsilane fraction of up to 0.8% by weight as binders for paint compositions with high scrub resistance. They are prepared by discontinuous emulsion polymerization in the presence of emulsifiers and/or protective colloids.

EP 612771A1 describes aqueous polymeric dispersions for producing low-emission emulsion paints on the basis of copolymers which as functional monomer units comprise vinylsilane in combination with (meth)acrylamide and/or (meth)acrylic acid. They are prepared in a batch process in the presence of anionic emulsifiers or mixtures thereof with nonionic emulsifiers.

The report of the Fatipec Congress of Jun. 10-14, 1996, includes a study of the properties of VAE copolymer dispersions as binders in highly filled paints, particularly with regard to the copolymer used and the effect of the emulsifier-protective colloid system. Described as particularly advantageous are VAE copolymers containing <1% of vinylsilane units, prepared in the presence of protective colloid and nonionic emulsifier. An increase in the emulsifier content from 1.5% to 50 brought about a reduction in the particle size and in the Tg and led to an improvement in the pigment-binding capacity.

The key breakthrough in the development of binders for coating materials with high wet abrasion resistance was achieved with the VAE copolymers with vinylsilane- and epoxy-functional comonomer units in accordance with EP 1153979 A2. The preparation takes place by discontinuous emulsion polymerization in the presence of mixtures of nonionic and anionic emulsifiers.

To improve the hydrophobicity of such binders from EP 1153979 A2, EP 1308468 A1 proposes modifying them with polysiloxane units.

WO 2006/111290 A1 advises using coating materials with high scrub resistance on the basis of VAE copolymers with silane and epoxy monomer units, these binders being prepared with the sulfosuccinates and nonionic emulsifiers already described from EP 1153979 A2.

EP 2017313 A1 advises designing the preparation of binders for coating materials with high weathering resistance, on the basis, known from EP 1153979 A2, of vinyl ester polymers having silane-functional and epoxy-functional comonomer units, in such a way that in a first stage, vinyl ester and optionally further monomers are added together with emulsifier and/or protective colloid, and, after the polymerization reaction has subsided, further monomers are added and the polymerization is initiated again.

In EP 2166050 A2 an attempt is made to improve the wet abrasion resistance of the vinyl ester copolymers with silane-functional and epoxy-functional comonomer units, known from EP 1153979 A2, by means of blending with acrylate latex.

Vinyl acetate-ethylene copolymers which contain vinylsilane and epoxy monomer units are virtually impossible to improve in terms of wet abrasion resistance in application as coating materials. A problem, however, is their preparation in a discontinuous emulsion polymerization process, in particular because of the long cycle time of batch operations like that from EP 1153979 A2, or on account of the very costly and inconvenient, multistage processes from EP 2017313 A1 and EP 2166050A2.

As compared with the frequently employed batch or semi-batch operations, continuous polymerization processes offer the advantage of a more efficient utilization of plant capacity. Downtime as a result of cleaning and preparation phases, which have to be inserted between individual batch procedures, are taken into account hardly at all, allowing significantly high capacities and lower preparation costs to be achieved. A disadvantage of continuous polymerization, however, is that product properties change in comparison to the batch operation, in some cases disadvantageously so. It is known, for example, that the stabilization of continuously prepared dispersions is considered to be critical. Owing to a broad residence-time distribution, the dispersions obtained are usually broader in distribution, with coarser particles. For application in coating materials, the particle size and its distribution are important variables, which impact on performance properties, such as the wet abrasion resistance, for example, of paints enhanced with these binders. Shifting the particle size distribution into a larger range therefore results in a decrease in the wet abrasion resistance.

A favored plant configuration frequently selected for continuous polymerization is the stirred-tank cascade, since polymerization in stirred-tank reactors is known from batch operation and the cost and effort involved in converting a plant is comparatively small by comparison with other known continuous plants, such as a tube reactor, for example. The difficulty is in particular the establishment of suitable and stable operating conditions. Consequently, operational fluctuations and irregular product properties are not uncommon. Coatings on the reactor walls and an oscillating particle size are identified as consequences.

Petrocelli, Polym. Sci. Eng., 80, 544 discloses a process for continuous emulsion polymerization in which polymerization takes place in two serial pressure reactors. The monomers, polyvinyl alcohol, and seed latex are metered continuously to the first pressure reactor, and polymer dispersion is withdrawn in equal volume from the second pressure reactor. A disadvantage here, as well as the use of seed latex, is the increase in particle size relative to the batch process, since an increase in particle size in coating materials has the effect of lowering the wet abrasion resistance.

DE-A 2456576 describes a process for continuous polymerization of vinyl acetate-ethylene dispersions in a pressure reactor with a downstream reaction tube. In order to avoid wall accretions and to ensure a uniform course of the polymerization, the use is advised of a redox initiator mixture containing a 3- to 10-fold excess of reducing agent.

EP 5073 B1 discloses a process for continuous emulsion polymerization of vinyl acetate and ethylene, in which the reactants are provided in premixers and are transferred together with seed latex into a pressure reactor. The product from the pressure reactor is then transferred into a postpolymerization reactor.

EP 1067147 A2 describes a continuous polymerization process for producing high-solids-content vinyl acetate-ethylene copolymer dispersions. For the continuous polymerization, seed latex is used, and for stabilization polyvinyl alcohol exclusively is used, and no emulsifier is employed. The polymerization takes place in two serial pressure reactors and a devolatilizing reactor. Monomers, seed latex, and PVOH are added continuously in the 1st reactor.

EP 1174445 A1 describes a process for continuous polymerization of vinyl ester-ethylene copolymers where the reducing component of the redox initiator is metered at least partly in the first reactor. Relatively coarse polymer particles with a weight-average diameter of more than 1000 nm are obtained.

EP 1323752 A1 describes a process for the continuous polymerization of protective-colloid-stabilized polymers based on vinyl esters and ethylene. With polyvinyl alcohol as the protective colloid used, dispersions having a weight-average diameter Dw of 800 to 1400 nm are obtained, the protective colloid being metered into both reactors. This form of particle stabilization affords an inadequate particle size distribution for the preparation of dispersions for the application described here (binders in paints).

SUMMARY OF THE INVENTION

The object of the invention, therefore, was to develop an efficient process for preparing polymers in the form of their aqueous dispersions on the basis of vinyl esters, ethylene, and optionally further ethylenically unsaturated, functionalized comonomers, by means of radically initiated, continuous emulsion polymerization, that allows good performance properties to be achieved as well, especially in coating materials.

DETAILED DESCRIPTION OF THE INVENTION

The invention provides a process for the aqueous, radically initiated, continuous emulsion polymerization of A) at least one vinyl ester and optionally at least one (meth)acrylic ester, B) ethylene, and C) 0% to 10% by weight, based on the total weight of the monomers, of one or more ethylenically unsaturated, functionalized comonomers, in the presence of 3.0% to 12.5% by weight, based on the total weight of the monomers, of one or more emulsifiers, where at least 50% by weight, based on the total weight of emulsifiers, are nonionic emulsifiers, and 0% to 10% by weight, based on the total weight of the monomers, of one or more protective colloids, in a stirred-tank cascade with at least two serial pressure reactors and downstream therefrom at least one low-pressure reactor, where polymerization takes place in the pressure reactors at a temperature of 50° C. to 90° C. under a pressure of 10 to 90 bar abs., and the polymerization is conducted such that at least 80% by weight of the total weight of emulsifiers is metered in the first pressure reactor, and at least 50% by weight each of the total weight of comonomer A) and comonomer B) is added in the first pressure reactor, the remaining amounts of the monomers A) and B) are added in the following pressure reactors, and the polymerization in the first pressure reactor is conducted through to a monomer conversion of ≥30% by weight, based on the total weight of the monomers used in the process, and in the last pressure reactor it is conducted through to a monomer conversion of ≥90% by weight, based on the total weight of the monomers used in the process, and polymerization to completion takes place in the at least one low-pressure reactor at a temperature of 30° C. to 60° C. under a pressure of not more than 4 bar abs.

By continuous polymerization is meant a polymerization process in which reactants are supplied continuously to the polymerization reactor or to a reactor cascade and the polymerization product is withdrawn continuously to the same extent; in other words, the volume flow resulting from the continuous operation is equal to the sum of all of the component flows supplied continuously to the operation.

Suitable monomers A) from the group of the vinyl esters are those of carboxylic acids having 1 to 12 C atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, as for example VeoVa9$^R$ or VeoVa10$^R$ (tradenames of the company Hexion). Particularly preferred is vinyl acetate. The stated vinyl esters are copolymerized in general in an amount of 30% to 90% by weight, preferably 70% to 90% by weight, based in each case on the total weight of the monomers.

Suitable monomers A) from the group of the methacrylic esters or acrylic esters are esters of unbranched or branched alcohols having 1 to 15 C atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Preference is given to methyl acrylate, methyl methacrylate, ethyl acrylate, n-butyl acrylate n-butyl methacrylate, hexyl acrylate, and 2-ethylhexyl acrylate. These comonomers are copolymerized optionally in an amount of up to 20% by weight, preferably 5% to 20% by weight, based in each case on the total weight of the monomers.

The monomer B), ethylene, is copolymerized in general in an amount of 1% to 30% by weight, preferably 10% to 30% by weight, based in each case on the total weight of the monomers.

Optionally it is possible, further to the monomers A) and B), for 0.05% to 10% by weight, based on the total weight of the monomers, of auxiliary monomers D) to be copolymerized. Examples of auxiliary monomers D) are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride, ethylenically unsaturated sulfonic acids and/or salts thereof, preferably vinylsulfonic acid, 2-acylamido-2-methylpropanesulfonic acid. Further examples are precrosslinking comonomers such as polyethylenically unsaturated comonomers, examples being divinyl adipate, diallyl maleate, allyl methacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide, of N-methylolmethacrylamide, and of N-methylolallylcarbamate. Also suitable as auxiliary monomers are monomers with hydroxyl or carboxyl groups, such as, for example, hydroxyalkyl esters of methacrylic acid and of acrylic acid, such as hydroxyethyl, hydroxypropyl or hydroxybutyl acrylate or methacrylate, and also 1,3-dicarbonyl compounds such as acetoacetoxyethyl acrylate, acetoacetoxypropyl methacrylate, acetoacet oxyethyl methacrylate, acetoacetoxybutyl methacrylate, 2,3-di(acetoacetoxy)propyl methacrylate, and allyl acetoacetate.

Preferred auxiliary monomers D) are ethylenically unsaturated monocarboxylic and dicarboxylic acids, ethylenically unsaturated carboxamides and carbonitriles, ethylenically unsaturated sulfonic acids and/or salts thereof.

Suitable ethylenically unsaturated, functionalized monomers C) are ethylenically unsaturated, hydrolyzable silicon compounds and ethylenically unsaturated compounds containing epoxide groups. These monomers may be copolymerized in total in an amount of up to 10% by weight, based on the total weight of the monomers. One or more ethylenically unsaturated, hydrolyzable silicon compounds may be copolymerized, or one or more ethylenically unsaturated compounds containing epoxide groups may be copolymerized, or mixtures of at least one ethylenically unsaturated, hydrolyzable silicon compound and at least one ethylenically unsaturated compound containing epoxide groups may be copolymerized.

Examples of ethylenically unsaturated, hydrolyzable silicon compounds are compounds of the general formula $R^1SiR_{0-2}(OR_2)_{1-3}$, where R has the definition $C_1$ to $C_3$ alkyl radical, $C_1$ to $C_3$ alkoxy radical or halogen (e.g., Cl or Br), $R^1$ has the definition $CH_2{=}CR^3(CH_2)_{0-1}$ or $CH_2{=}CR^3CO_2(CH_2)_{1-3}$, $R^2$ is a unbranched or branched, optionally substituted alkyl radical or acyl radical having 1 to 12 C atoms, which may optionally be interrupted by an ether group, and $R^3$ stands for H or $CH_3$. Examples of these compounds are vinyltrimethoxysilane, vinyltriethoxysilane, vinyltripropoxysilane, vinyltriisopropoxysilane, vinyltributoxysilane, vinyltriacetoxysilane, 3-methacryloyloxypropyltrimethoxysilane, 3-methacryloyloxypropyltriethoxysilane, vinyltrichlorosilane, vinylmethyldichlorosilane, vinylmethyldichlorosilane, vinyltris(2-methoxyethoxysilane), trisacetoxyvinylsilane.

Further examples of ethylenically unsaturated, hydrolyzable silicon compounds are α-silanes in which the silicon atom substituted by alkoxy or OH group is joined directly via a methylene bridge to an unsaturated hydrocarbon radical, as for example α-methacryloyloxymethylmethoxydimethylsilane, α-methacryloyloxymethyldimethoxymethylsilane, α-methacryoyloxymethyltrimethoxysilane.

Preference is given to γ-acryloyl- and γ-methacryloyloxypropyltri(alkoxy)silanes, vinylalkyldialkoxysilanes, and vinyltrialkoxysilanes, having C1 to C12 alkoxy groups and optionally C1 to C3 alkyl radicals, with examples of C1 to C12 alkoxy groups that can be used being methoxy, ethoxy, methoxyethylene, ethoxyethylene, methoxypropylene glycol ether and/or ethoxypropylene glycol ether radicals, and also α-silanes. Ethylenically unsaturated, hydrolyzable silicon compounds that are most preferred are vinyltrimethoxysilane, vinyltriethoxysilane, 3-methacryloyloxypropyltrimethoxysilane, 3-methacryloyloxypropyltriethoxysilane, α-methacryloyloxymethyltriethoxysilane.

The fraction of ethylenically unsaturated, hydrolyzable silicon compounds C) is preferably 0.05% to 5% by weight, more preferably 0.1% to 1% by weight, based in each case on the total weight of the monomers.

Suitable ethylenically unsaturated, functionalized monomers C) are also ethylenically unsaturated compounds containing epoxide groups, such as, for example, glycidyl methacrylate, glycidyl acrylate, allyl glycidyl ether, vinyl glycidyl ether, vinylcyclohexane oxide, limonene oxide, myrcene oxide, caryophyllene oxide, and styrenes and vinyltoluenes substituted by a glycidyl radical on the aromatic moiety, and also vinyl benzoates substituted by glycidyl radicals on the aromatic moiety. Preference is given to glycidyl acrylate, glycidyl methacrylate, allyl glycidyl ether, and vinyl glycidyl ether.

The fraction of ethylenically unsaturated monomers C) containing epoxide groups is preferably 0.1% to 5% by weight, more preferably 0.25% to 1.5% by weight, based in each case on the total weight of the monomers.

Copolymerized most preferably are 0.05% to 5% by weight of at least one ethylenically unsaturated, hydrolyzable silicon compound and 0.1% to 5%, by weight of at least one ethylenically unsaturated compound containing epoxide groups, based in each case on the total weight of the monomers.

The figures in % by weight for the monomers A), B), C), and auxiliary monomers D) add up in each case to 100% by weight for the total weight of the copolymerized monomers.

Preferred comonomer mixtures are those which contain vinyl acetate and ethylene, more preferably those containing 70% to 90% by weight of vinyl acetate and 1% to 30% by weight of ethylene; and also comonomer mixtures which contain 50% to 90% by weight of vinyl acetate and 1% to 30% by weight of ethylene, more preferably 10% to 30% by weight of ethylene, and preferably 1% to 20% by weight of one or more further comonomers from the group of the vinyl esters having 1 to 12 C atoms in the carboxylic acid residue, such as vinyl propionate, vinyl laurate, vinyl esters of alpha-branched carboxylic acids having 9 to 11 C atoms such as VeoVa9, VeoVa10, VeoVa11; and comonomer mixtures of vinyl acetate, with 1% to 30% by weight of ethylene, more preferably 10% to 30% by weight of ethylene, and preferably 1% to 20% by weight of acrylic esters of unbranched or branched alcohols having 1 to 15 C atoms, more particularly methylacrylate, methyl methacrylate, ethyl acrylate, n-butyl acrylate, n-butyl methacrylate, hexyl acrylate or 2-ethylhexyl acrylate; and mixtures of vinyl acetate, 1% to 20% by weight of vinyl laurate or vinyl esters of alpha-branched carboxylic acid having 9 to 11 C atoms, and also 1% to 20% by weight of acrylic esters of unbranched or branched alcohols having to 1 to 15 C atoms, more particularly methylacrylate, methyl methacrylate, ethyl acrylate, n-butyl acrylate n-butyl methacrylate, hexyl acrylate or 2-ethylhexyl acrylate; it being possible for the mixtures to further comprise the stated auxiliary monomers D) and functionalized monomers C) in the stated amounts;

and the figures in % by weight for the individual mixtures add up to 100% by weight in each case.

The monomer selection and the selection of the weight fractions of the comonomers are made such that in general the result is a glass transition temperature, Tg, of −50° C. to +50° C. The glass transition temperature Tg of the polymers can be determined in a known way by means of differential scanning calorimetry (DSC). The Tg may also be calculated approximately in advance using the Fox equation. According to Fox T. G., Bull. Am. Physics Soc. 1, 3 page 123 1956) the following is the case: $1/Tg=x_1/Tg_1+x_2/Tg_2+ \ldots +x_n/Tg_n$, where $x_n$ stands for the mass fraction (% by weight/100) of the monomer n, and $Tg_n$ is the glass transition temperature, in kelvins, of the homopolymer of the monomer n. Tg values for homopolymers are listed in Polymer Handbook, 2nd edition, J. Wiley & Sons, New York (1975).

The polymerization is initiated using the redox initiator combinations that are customary for emulsion polymerization. Examples of suitable oxidation initiators are the sodium, potassium, and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Preference is given to the sodium, potassium, and ammonium salts of peroxodisulfuric acid and to hydrogen peroxide. The stated initiators are used in general in an amount of 0.01% to 2.0% by weight, based on the total weight of the monomers.

The stated oxidizing agents, more particularly salts of peroxodisulfuric acid, may also be used on their own as thermal initiators.

Suitable reducing agents are the sulfites and bisulfites of the alkali metals and of ammonium, as for example sodium sulfite, the derivatives of sulfoxylic acid such as zinc sulfoxylates or alkali metal formaldehyde sulfoxylates, as for example sodium hydroxymethanesulfinate (Bruggolit), and (iso)-ascorbic acid. It is preferred to use sodium hydroxylmethanesulfinate and sodium sulfite. The amount of reducing agent is preferably 0.015% to 3% by weight, based on the total weight of the monomers.

For controlling the molecular weight it is possible to use regulating substances during the polymerization. If regulators are used, they are employed typically in amounts between 0.01% to 5.0% by weight, based on the total weight of the monomers to be polymerized, and are metered separately or else as a premix with reaction components. Examples of such substances are n-dodecyl mercaptan, tert-dodecyl mercaptan, mercaptopropionic acid, methyl mercaptopropionate, isopropanol, and acetaldehyde. It is preferred not to use any regulating substances.

Emulsifiers used are nonionic emulsifiers, optionally in combination with anionic emulsifiers. Suitable nonionic emulsifiers are, for example, acyl, alkyl, oleyl, and alkylaryl ethoxylates. These products are available commercially, for example, under the name Genapol® or Lutensol®. They include ethoxylated mono-, di-, and tri-alkylphenols, preferably having a degree of ethoxylation of 3 to 50 ethylene oxide units and $C_4$ to $C_{12}$ alkyl radicals, and also ethoxylated fatty alcohols, preferably having a degree of ethoxylation of 3 to 80 ethylene oxide units and $C_8$ to $C_{36}$ alkyl radicals. Suitable nonionic emulsifiers are also $C_{13}$-$C_{15}$ oxo-process alcohol ethoxylates having a degree of ethoxylation of 3 to 30 ethylene oxide units, $C_{16}$-$C_{18}$ fatty alcohol ethoxylates having a degree of ethoxylation of 11 to 80 ethylene oxide units, $C_{10}$ oxo-process alcohol ethoxylates having a degree of ethoxylation of 3 to 11 ethylene oxide units, $C_{13}$ oxo-process alcohol ethoxylates having a degree of ethoxylation of 3 to 20 ethylene oxide units, polyoxyethylenesorbitan monooleate having 20 ethylene oxide groups, copolymers of ethylene oxide and propylene oxide with a minimum content of at least 10% by weight of ethylene oxide, polyethylene oxide ethers of oleyl alcohol, having a degree of ethoxylation of 4 to 20 ethylene oxide units, and also the polyethylene oxide ethers of nonylphenol, having a degree of ethoxylation of 4 to 20 ethylene oxide units.

Particularly preferred are $C_{12}$-$C_{14}$ fatty alcohol ethoxylates having a degree of ethoxylation of 3 to 20 ethylene oxide units.

Optionally it is also possible to use mixtures of nonionic and anionic emulsifiers. Examples of suitable anionic emulsifiers are sodium, potassium, and ammonium salts of straight-chain aliphatic carboxylic acids having 12 to 20 C atoms; sodium hydroxyoctadecanesulfonate; sodium, potassium, and ammonium salts of hydroxyl-fatty acids having 12 to 20 C atoms and the sulfonation and/or acetylation products thereof; sodium, potassium, and ammonium salts of alkyl sulfates, also as triethanolamine salts, and sodium, potassium, and ammonium salts of alkylsulfonates having in each case 10 to 20 C atoms and of alkylarylsulfonates having 12 to 20 C atoms; dimethyldialkylammonium chloride having 8 to 18 C atoms and its sulfonation products; sodium, potassium, and ammonium salts of sulfosuccinic esters with aliphatic saturated monohydric alcohols having 4 to 16 C atoms, and sulfosuccinic 4-esters with polyethylene glycol ethers of monohydric aliphatic alcohols having 10 to 12 C atoms, more particularly their disodium salts, and of sulfosuccinic 4-ester with polyethylene glycol nonylphenyl ether, more particularly its disodium salt, and of biscyclohexyl sulfosuccinate, more particularly its sodium salt; ligninsulfonic acid and also its calcium, magnesium, sodium, and ammonium salts; resin acids and also hydrogenated and dehydrogenated resin acids, and also their alkali metal salts.

The most preferred anionic emulsifiers are the sodium, potassium, and ammonium salts of alkyl sulfates and of alkylsulfonates having in each case 10 to 20 C atoms, and also of alkylarylsulfonates having 12 to 20 C atoms, and of sulfosuccinic esters with aliphatic saturated monohydric alcohols having 4 to 16 C atoms.

The amount of emulsifier is 3% to 12.5% by weight, preferably 3% to 7% by weight, based in each case on the total weight of the monomers. It is possible to use exclusively nonionic emulsifier. Preference is given to using mixtures of one or more nonionic emulsifiers and one or more anionic emulsifiers, with the fraction of the nonionic emulsifiers in the mixture being at least 50% by weight, preferably at least 75% by weight, based in each case on the total weight of nonionic and anionic emulsifier.

Further to the stated emulsifiers, it is particularly preferred to also use protective colloids as surface-active compounds.

Suitable protective colloids are polyvinyl alcohols; polyvinyl acetals; polyvinylpyrrolidones; polysaccharides in water-soluble form such as starches (amylase and amylopectin), celluloses and their carboxymethyl, methyl, hydroxyethyl, hydroxypropyl derivatives; proteins such as casein or caseinate, soya protein, gelatine; lignosulfonates, synthetic polymers such as poly(meth)acrylic acid, copolymers of (meth)acrylates with carboxyl-functional comonomer units, poly(meth)acrylamide, polyvinylsulfonic acids, and the water-soluble copolymers thereof; melamine-formaldehyde sulfonates, naphthalene-formaldehyde sulfonates, styrene-maleic acid copolymers, and vinyl ether-maleic acid copolymers.

Preference is given to using partially hydrolyzed or fully hydrolyzed polyvinyl alcohols, more preferably those from the group of the partially hydrolyzed polyvinyl alcohols having a degree of hydrolysis of 80 to 95 mol % and a Höppler viscosity, in 4% strength aqueous solution, of 1 to 30 mPas (method of Höppler at 20° C., DIN 53015). Preference is also given to partially hydrolyzed, hydrophobically modified polyvinyl alcohols having a degree of hydrolysis of 80 to 95 mol % and a Höppler viscosity, in 4% strength aqueous solution, of 1 to 30 mPas. Examples thereof are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 C atoms, dialkyl maleates and alkyl fumarates, such as diisopropyl maleate and diisopropyl fumarate, vinyl chloride, vinyl alkyl ethers such as vinyl butyl ether, olefins such as ethene and decene. The fraction of the hydrophobic units is preferably 0.1% to 10% by weight, based on the total weight of the partially hydrolyzed polyvinyl alcohol. It is also possible to use mixtures of the stated polyvinyl alcohols. Other preferred polyvinyl alcohols are partially hydrolyzed, hydrophobized polyvinyl alcohols, which are obtained by polymer-analogous reaction, as for example acetalization, of the vinyl alcohol units with $C_1$ to $C_4$ aldehydes such as butyraldehyde. The fraction of the hydrophobic units is preferably 0.1% to 10% by weight, based on the total weight of the partially hydrolyzed polyvinyl acetate. The degree of hydrolysis is from 80 to 95 mol %, preferably 85 to 94 mol %; the Höppler viscosity (DIN 53015, method of Höppler, 4% strength aqueous solution) is from 1 to 30 mPas, preferably 2 to 25 mPas.

For the process of the invention it is most preferred to use polyvinyl alcohols having a degree of hydrolysis of 85 to 94 mol % and a Höppler viscosity, in 4% strength aqueous solution, of 3 to 25 mPas (method of Höppler at 20° C., DIN 53015). The stated protective colloids are obtainable by means of processes known to the skilled person.

The protective colloids are added preferably in an amount of 1% to 10% by weight, more preferably 1% to 6% by weight, in each case based on the total weight of the monomers, during the polymerization. It is particularly preferred to use a mixture of the stated emulsifiers and protective colloids; especially suitable is a mixture of at least one nonionic emulsifier, at least one anionic emulsifier, and at least one protective colloid, in each case in the aforementioned amounts.

The polymerization is carried out in at least two serial pressure reactors and then continued in at least one low-pressure reactor. Pressure reactors and low-pressure reactors used can be the conventional, appropriately dimensioned steel reactors with stirring apparatus, heating/cooling system, and lines for the supply of the reactants and removal of the products. The preferred plant configuration consists of two serial pressure reactors and one or two downstream low-pressure reactors. Where a plurality of low-pressure reactors are used, they may be operated either alternately (in parallel) or in series (one after another). Higher cascades with more than two pressure reactors can be used, but are not always desirable on account of the sharply increasing plant complexity they entail.

The operation is performed such that in all of the pressure reactors the sum of the entering mass flows is equal to the sum of the emerging mass flows. The low-pressure reactors are preferably operated alongside one another and used in alternation. The pressure in the serial pressure reactors is set such that from the first to the last of the serial pressure reactors there is a decreasing pressure gradient, which ensures mass flow in the pressure reactor cascade. Mass transport from the last pressure reactor into the downstream low-pressure reactor can be accomplished by means of pressure-regulated valves or by means of a pump to the same degree as the mass flows are supplied to the upstream pressure reactors.

Prior to the beginning of the polymerization, the pressure reactors are filled to 50% to 80% of their volume with a polymer dispersion which corresponds preferably to the end product of the polymerization in terms of copolymer composition, nature and amount of the surface-active compound(s) (emulsifiers and protective colloids), and also particle size and solids content. This can be done by preparing this dispersion in the pressure reactors by a batch polymerization, or by filling the pressure reactors with a separately prepared dispersion.

The pressure reactors are subsequently charged with ethylene. The ethylene pressure is regulated such as to result in a decrease in pressure gradient from the first to the last of the serial pressure reactors. The pressure reactors are operated at a temperature of 50° C. to 90° C. under a pressure of 10 to 90 bar abs., preferably at a pressure p1 of preferably 30 to 80 bar abs. in the first pressure reactor and at a pressure p2 of preferably 10 to bar abs. in the last pressure reactor, with the proviso that p1>p2. The pressure difference between two serial pressure reactors is preferably 2 to 40 bar.

50% to 100% by weight, preferably more than 70% by weight, based on the total weight of all the monomers A), is metered in the first pressure reactor, and the remainder is metered into the subsequent pressure reactors. Monomer B), ethylene, is introduced to an extent of at least 50% by weight in the first pressure reactor, and the remainder is metered into the subsequent pressure reactors. The functionalized monomers C) can be metered partly or wholly in the first pressure reactor or partly or wholly in one of the further pressure reactors. A portion of the monomers C) may also mot be metered in until the low-pressure reactor. Where, as monomers C), ethylenically unsaturated compounds containing epoxide groups are copolymerized in combination with ethylenically unsaturated, hydrolyzable silicon compounds, they are preferably metered in separately from one another. More preferably such that one of the components is metered into the first pressure reactor and the other is metered into one of the subsequent pressure reactors or is at least in part not metered in until the low-pressure reactor. The addition of the stated auxiliary monomers D) may take place wholly or partly both in the first and in one of the subsequent pressure reactors, or in the low-pressure reactor. The auxiliary monomers D) are preferably metered completely into the first pressure reactor.

The fraction of emulsifiers may either be metered completely in the first pressure reactor, or else metered partly in the first pressure reactor, with the remainder being metered into further pressure reactors and/or into the downstream low-pressure reactors. In that case at least 80% by weight of the emulsifier fraction is introduced initially or metered into the first pressure reactor. With particular preference the entire emulsifier fraction is metered in the first pressure reactor. If protective colloid is used, it is preferably metered in as a mixture with the emulsifiers. This protective colloid may be metered only into the first pressure reactor, or its metered addition may be divided between the pressure reactors and low-pressure reactors. With particular preference the total amount of emulsifier and optionally protective colloid is metered in the first pressure reactor.

The polymerization is initiated with a redox system comprising an oxidizing component and a reducing component, with both components being metered into all pressure reactors. The monomer conversion is controlled with the initiator feed. The initiators are metered in total such as to ensure a continuous polymerization, and the polymerization in the first pressure reactor is taken to a conversion of at least 30% by weight and in the last pressure reactor of at least 90% by weight, based in each case on the total weight of the monomers used in the process.

Overall, the metering rates for the reactants are set so as to result in average residence times of preferably 60 to 240 minutes in total in the pressure reactor cascade.

After the end of the polymerization in the pressure reactor cascade, polymerization continues in the low-pressure reactor for the purpose of removing residual monomers, using known methods, generally by means of postpolymerization initiated with redox catalyst. In the low-pressure reactor, polymerization is completed preferably under atmospheric pressure or below, in other words at a pressure of ≤1 bar abs. and at a temperature of 30° C. to 60° C. The polymerization is continued preferably through to a conversion of at least 99% by weight, based on the total weight of the monomers used in the process, more preferably through to a free monomer content of ≤1000 ppm. In the low-pressure reactors, both initiator components are added to the degree necessary for the final formulation.

Volatile residual monomers can be removed subsequently by means of distillation, preferably under reduced pressure, and optionally with inert entraining gases such as air, nitrogen or steam being passed through or over the reactor contents.

The aqueous dispersions obtainable with the process of the invention have a solids content of 30% to 75% by weight, preferably of 50% to 60% by weight.

The aqueous polymer dispersions can be used in the areas of application typical for such dispersions: for example, as binders for coating materials and adhesives, tile adhesives, and adhesives for thermal insulation composite systems. Preferably in polymeric emulsion paints, as masonry paint or interior paint, and in polymeric dispersion renders.

The formulations for polymeric emulsion paints and polymeric dispersion renders are known to the skilled person, and generally include 5% to 50% by weight of the aqueous polymeric binder, 5% to 35% by weight of water, 5% to 80% by weight of filler, 5% to 30% by weight of pigments, and also 0.1% to 10% by weight of further additives, the figures in % by weight in the formulation adding up to 100% by weight.

Examples of fillers which can be used are carbonates such as calcium carbonate in the form of calcite, chalk, and marble, and also magnesium calcium carbonate in the form of dolomite. Other examples are silicates, such as magnesium silicate in the form of talc, or aluminum silicates such as loam and clays; finely ground quartz, quartz sand, highly disperse silica, and feldspar. Also suitable are fiber fillers. In actual practice, mixtures of different fillers are frequently used. Polymeric renders generally comprise more coarsely particulate fillers than emulsion paints. The particle size in this case is often between 0.2 and 5.0 mm. Otherwise, polymeric renders may comprise the same additives as emulsion paints.

Examples of suitable pigments include titanium dioxide, zinc oxide, iron oxides, and carbon black as inorganic pigments, and also the customary organic pigments. Examples of other additives are wetting agents in fractions of generally 0.1% to 0.5% by weight, based on the overall weight of the formulation. Examples thereof are sodium and potassium polyphosphates, polyacrylic acids and salts thereof. Additives also include thickeners, which are used generally in an amount of 0.01% to 2.0% by weight, based on the overall weight of the formulation. Customary thickeners are cellulose ethers, starches, or bentonite as an example of an inorganic thickener. Further additives are preservatives, defoamers, freeze-thaw stabilizers.

For producing the adhesive and coating materials, the polymer dispersion is mixed and homogenized with the other formulation ingredients, filler, and further adjuvants in suitable mixers. When pasty materials are being produced, it is common first to introduce the water fraction, to add the dispersion, and, lastly, to incorporate the solids with stirring.

The pigment-volume concentration (PVC) of pigmented coating materials such as polymeric emulsion paints is situated generally within the range from 10% to 90% and is calculated in line with the following formula: PCV(%)=$(V_{P+F} \times 100)/(V_{P+F}+V_B)$ where $V_{P+F}$=sum of volume of pigment and filler, $V_B$=volume of binder. At a PVC ≥50%, coating materials are termed highly filled.

The polymer dispersions obtained with the process of the invention are suitable as binders in conventional formulations for emulsion paints. Where functional comonomers C) are copolymerized, functionalized polymers are obtained which are notable for high wet abrasion resistance, even in highly filled compositions formulated supercritically—in other words, in coating materials having a high pigment volume concentration (PVC)≥50%, preferably 60% to 85%. The functionalized copolymers are particularly advantageous as binders in coating material formulations for highly filled, low-emission interior paints. Particularly advantageous is a particle size for the dispersed polymer particles with a weight-average median of <800 nm, which is determined by means of static light scattering measurement.

The examples which follow serve for further illustration of the invention:

Comparative Example 1

A pressure reactor R1 (volume: 18 l) was charged with 11 kg of an aqueous dispersion of a copolymer whose composition is 85% by weight vinyl acetate and 15% by weight ethylene, stabilized with 7% by weight, based on the copolymer, of a polyvinyl alcohol, having a Höppler viscosity in a 4% strength by weight solution of 4 mPas, and having a degree of hydrolysis of 88 mol %. The initial charge further included 1850 g of vinyl acetate and 720 g of a 20% strength by weight aqueous solution of a polyvinyl alcohol, having a Höppler viscosity in a 4% strength by weight solution of 4 mPas, and having a degree of hydrolysis of 88 mol %. The pressure reactor R1 was connected to a further pressure reactor R2, of the same size, which was filled with 17 kg of the same dispersion as that forming the initial charge in pressure reactor R1. Both pressure reactors were charged with ethylene, the pressure in pressure reactor R1 being 70 bar and in pressure reactor R2 being 35 bar. The driving force for mass flow was therefore the pressure difference between the two pressure reactors. From the second pressure reactor R2 the dispersion was taken off by means of a pump at the rate at which the overall flows of material were supplied via the metered feeds to the two pressure reactors. Both pressure reactors were heated to a temperature of 65° C. and the reaction was started by commencement of the initiator feeds: potassium persulfate (3% by weight in water) and Brüggolit (1.5% by weight in water).

At the start of reaction, evident from an increase in temperature, further metered feeds were commenced in the pressure reactor R1: 3600 g/h of vinyl acetate, 4320 g/h of a 6.6% strength by weight aqueous polyvinyl alcohol solution, having a Höppler viscosity in a 4% strength by weight solution of 4 mPas, and having a degree of hydrolysis of 88 mol %.

Ethylene was metered at a rate of 1150 g/h and at 70 bar pressure in the pressure reactor R1. The dispersion was transferred from the pressure reactor R2 into a downstream low-pressure reactor, where it was postpolymerized under atmospheric pressure (1 bar abs.) and at a temperature of 60° C. with 20 ml/h of tert-butyl hydroperoxide (10% by weight in water) and 20 ml/h of Brüggolit (10% by weight in water).

The polymerization was carried out over a period of 24 hours.

The dispersion obtained had a solids content of 50.0% by weight, a viscosity of 130 mPas (Brookfield, 20, 23° C.), and a glass transition temperature of 6.0° C. The median of the weight-average particle size distribution Dw for the dispersion was 1160 nm and was stable over the duration of the reaction. The conversion rate, based in each case on the total weight of the monomers used in the process, was 63.7% by weight in pressure reactor R1 and 98.2% by weight in pressure reactor R2. The residual monomer content in the low-pressure reactor was 300 ppm.

Example 2

A pressure reactor R1 (volume: 18 l) was charged with 11 kg of an aqueous dispersion of a copolymer whose composition was 87% by weight vinyl acetate and 13% by weight ethylene, stabilized with 5.5% by weight, based on the copolymer, of an emulsifier mixture. The composition of the emulsifier mixture was as follows:

9% by weight, based on the total weight of the emulsifiers, of an alkanesulfonate sodium salt (Mersolat), 12% by weight, based on the total weight of the emulsifiers, of a dodecylbenzenesulfonic acid sodium salt (Melon), and 79% by weight, based on the total weight of the emulsifiers, of an isotridecyl alcohol polyglycol ether having a degree of ethoxylation of 15 (Genapol X150). The initial charge additionally included 600 g of ethylene, 3000 g of vinyl acetate, and 3820 g of an aqueous emulsifier mixture consisting of 231 g of isotridecyl alcohol polyglycol ether having a degree of ethoxylation of 15 (Genapol X150), 26 g of an alkanesulfonate sodium salt (Mersolat), 35 g of dodecylbenzenesulfonic acid sodium salt (Melon), 18 g of vinyl sulfonate, 17 g of sodium acetate, and the remainder (3493 g) of water. The pressure reactor R1 was connected to a further pressure reactor R2 of the same size, with pressure reactor R2 being filled with 17 kg of the same dispersion as that forming the initial charge in pressure reactor R1. Both pressure reactors were charged with ethylene, the pressure in pressure reactor R1 being 70 bar and in pressure reactor R2 being 35 bar, and were brought to a temperature of 70° C., and the reaction was started by metered feed of a redox initiator system comprising 100 g/h of an ammonium persulfate solution (5% by weight in water) and 100 g/h of a sodium sulfite solution (4.2% by weight in water) in pressure reactor R1, and 250 g/h of ammonium persulfate solution (5% by weight in water) and 350 g/h of sodium sulfite solution (4.2% by weight in water) in pressure reactor R2. At the start of reaction, evident from an increase in temperature, further metered feeds were commenced in the pressure reactor R1: 3000 g/h of vinyl acetate, 3820 g/h of the emulsifier mixture having the composition described for the initial charge, and 600 g/h of ethylene. In addition, 1650 g/h of vinyl acetate were also metered in to the pressure reactor R2. The dispersion was transferred from the pressure reactor R2 into a downstream low-pressure reactor, where it was postpolymerized with sodium sulfite solution (4.2% by weight in water, metering rate 340 g/h) and tert-butyl hydroperoxide solution (10% by weight in water), 130 g/h) at a temperature of 60° C. The polymerization was carried out over a period of 24 hours.

The dispersion obtained had a solids content of 57.5% by weight, a viscosity of 40 mPas (Brookfield, 20, 23° C.), and a glass transition temperature of 3.4° C. The median of the weight-average particle size distribution Dw of the dispersion was 780 nm and was stable over the duration of the reaction. The conversion rate, based in each case on the total amount of the monomers used in the process, was 67.3% by weight in pressure reactor R1 and 96.9% by weight in pressure reactor R2. The residual monomer content in the low-pressure reactor was 700 ppm.

Example 3

The polymerization took place in the same way as described in example 2, with the difference that the 3820 g of the emulsifier mixture in initial charge and metered feed, consisting of 231 g of isotridecyl alcohol polyglycol ether having a degree of ethoxylation of 15 (Genapol X150), 26 g of alkanesulfonate sodium salt (Mersolat), 35 g of dodecylbenzenesulfonic acid sodium salt (Melon), 18 g of vinyl sulfonate, 17 g of sodium acetate, and 3493 g of water, were admixed in each case with 63 g of polyvinyl alcohol having a Höppler viscosity of 25 mPas and a degree of hydrolysis of 88 mol % (in 4% strength by weight aqueous solution). The polymerization was carried out over a period of 24 hours.

The dispersion obtained had a solids content of 54.5% by weight, a viscosity of 1270 mPas (Brookfield, 20, 23° C.), and a glass transition temperature of 4.0° C. The median of the weight-average particle size distribution Dw of the dispersion was 790 nm and was stable over the duration of the reaction. The conversion rate, based in each case on the total weight of the monomers used in the process, was 60.0% by weight in pressure reactor R1 and 97.4% by weight in pressure reactor R2. The residual monomer content in the low-pressure reactor was 400 ppm.

Comparative Example 4

The polymerization took place in the same way as described in example 3, with the difference that 79% by weight of the emulsifier mixture was supplied to reactor R1 and 21% by weight continuously to the reactor R2. The polymerization was carried out over a period of 24 hours. The dispersion obtained had a solids content of 56% by weight, a viscosity of 1270 mPas (Brookfield, 20, 23° C.), and a glass transition temperature of 4.7° C. The median of the weight-average particle size distribution Dw of the dispersion was 1000 nm (surface area: 8.7 $m^2/g$) and was stable over the duration of the reaction. The conversion rate, based in each case on the total weight of the monomers used in the process, was 64.5% by weight in pressure reactor R1 and 98.2% by weight in pressure reactor R2. The residual monomer content in the low-pressure reactor was 450 ppm.

Comparative Example 5

The polymerization took place in the same way as described in example 4, with the difference that the fractions of alkanesulfonate sodium salt (Mersolat) and dodecylbenzenesulfonic acid sodium salt (Melon) in the emulsifier feed were raised to 70 g of Mersolat and 90 g of Melon in initial charge and metered feed, and the fraction of the isotridecyl alcohol polyglycol ether having a degree of ethoxylation of 15 (Genapol X150) was reduced to 130 g in initial charge and metered feed. The weight fraction of ionic emulsifiers was therefore 55% by weight, based on the total weight of emulsifier. The polymerization was carried out over a period of 24 hours. The dispersion obtained had a solids content of 57.2% by weight, a viscosity of 790 mPas (Brookfield, 20, 23° C.), and a glass transition temperature of 6.9° C. The median of the weight-average particle size distribution Dw of the dispersion was 1010 nm and was stable over the duration of the reaction. The conversion rate, based in each case on the total weight of the monomers used in the process, was 70.9% by weight in pressure reactor R1 and 98.4% by weight in pressure reactor R2. The residual monomer content in the low-pressure reactor was 370 ppm.

Comparative Example 6

A pressure reactor R1 (volume: 18 l) was charged with 11 kg of an aqueous dispersion of a copolymer whose composition was 85% by weight vinyl acetate, 13% by weight ethylene, 1.0% by weight glycidyl methacrylate, and 1.0% by weight vinyltrimethoxysilane, stabilized with 5.5% by weight, based on the copolymer, of a mixture of 9% by weight, based on the total weight of the emulsifiers, of an anionic alkanesulfonate sodium salt (Mersolat) and 12% by weight, based on the total weight of the emulsifiers, of an anionic dodecylbenzenesulfonic acid sodium salt (Melon), and 79% by weight, based on the total weight of the emulsifiers, of a nonionic isotridecyl alcohol polyglycol ether having a degree of ethoxylation of 15 (Genapol X150), and was additionally stabilized with 1.2% by weight, based on the copolymer, of a polyvinyl alcohol having a Höppler viscosity in a 4% strength by weight aqueous solution of 25 mPas and a degree of hydrolysis of 88 mol %. Included additionally in the initial charge were 600 g of ethylene, 3000 g of a mixture of 2964 g of vinyl acetate and 36 g of vinyltrimethoxysilane, and also 3880 g of an aqueous emulsifier mixture, consisting of 231 g of isotridecyl alcohol polyglycol ether having a degree of ethoxylation of 15 (Genapol X150), 26 g of an alkanesulfonate sodium salt (Mersolat), 35 g of dodecylbenzenesulfonic acid sodium salt (Melon), 63 g of a polyvinyl alcohol having a Höppler viscosity of 25 mPas (in 4% strength by weight aqueous solution) and a degree of hydrolysis of 88 mol %, 18 g of vinyl sulfonate, 17 g of sodium acetate, and the remainder of water (3490 g). The pressure reactor R1 was connected to a further pressure reactor R2 of the same size, with pressure reactor R2 being filled with 17 kg of the same dispersion as that used for the initial charge in pressure reactor R1. Both pressure reactors were charged with ethylene, the pressure in pressure reactor R1 being 70 bar and in pressure reactor R2 being 35 bar. Both pressure reactors were brought to a temperature of 70° C. and the reaction was started by commencement of the metered feed of a redox initiator system comprising 200 g/h of an ammonium persulfate solution (5% by weight in water) and 200 g/h of a sodium sulfite solution (4.2% by weight in water) in pressure reactor R1 and 315 g/h of ammonium persulfate solution (5% by weight in water) and 440 g/h of sodium sulfite solution (4.2% by weight in water) in pressure reactor R2. At the start of reaction, evident from an increase in temperature, further metered feeds were commenced in the pressure reactor R1: 3000 g/h of a vinyl acetate/vinyltrimethoxysilane mixture comprising 2964 g of vinyl acetate and 36 g of vinyltrimethoxysilane, 3000 g/h of an emulsifier mixture with the composition described for the initial charge, and 600 g/h of ethylene. In the pressure reactor R2, additionally, the following metered feeds were commenced: 1650 g/h of a vinyl acetate/glycidyl methacrylate mixture comprising 1595 g of vinyl acetate and 55 g of glycidyl methacrylate, and 880 g/h of an emulsifier mixture having the composition as described for the initial charge. Therefore, 22% by weight of all of the emulsifiers was metered into the pressure reactor R2. The driving force for mass flow was therefore the pressure difference between the two pressure reactors. From the second pressure reactor R2, the dispersion was taken off by means of a pump at the rate at which the overall material flows were supplied via the metered feeds into the two pressure reactors. The dispersion was transferred from the pressure reactor R2 into a downstream low-pressure reactor (1 bar abs.) and post-polymerized at a temperature of 60° C. with sodium sulfite (4.2% by weight in water, 340 g/h) and tert-butyl hydroperoxide (10% by weight in water, 130 g/h).

The polymerization was carried out over a period of 24 hours.

The dispersion obtained had a solids content of 55.7% by weight, a viscosity of 1200 mPas (Brookfield, 20, 23° C.) and a glass transition temperature of 6.1° C. The median of the weight-average particle size distribution Dw of the dispersion was 1630 nm and was stable over the duration of the reaction. The conversion rate, based in each case on the total weight of the monomers used in the process, was 55.8% by weight in the pressure reactor R1 and 95.6% by weight in the pressure reactor R2. The residual monomer content in the low-pressure reactor was 710 ppm.

Example 7

The polymerization took place in the same way as described in comparative example 6, with the difference that the emulsifier feed of the described composition for pressure reactor 2, consisting of isotridecyl alcohol polyglycol ether having a degree of ethoxylation of 15 (Genapol X150), alkanesulfonate sodium salt (Mersolat), dodecylbenzenesulfonic acid sodium salt (Melon), polyvinyl alcohol having a Höppler viscosity of 25 mPas (in 4% strength by weight aqueous solution) and a degree of hydrolysis of 88 mol %, vinyl sulfonate, sodium acetate, and water, was supplied, continuously, exclusively to the pressure reactor 1. The polymerization was carried out over a period of 24 hours.

The dispersion obtained had a solids content of 55.1% by weight, a viscosity of 1580 mPas (Brookfield, 20, 23° C.), and a glass transition temperature of 6° C. The median of the weight-average particle size distribution Dw of the dispersion was 600 nm (surface area: 11.3 $m^2/g$) and was stable over the duration of the reaction. The conversion rate, based in each case on the total weight of the monomers used in the process, was 54.0% by weight in pressure reactor R1 and 91.3% by weight in pressure reactor R2. The residual monomer content in the low-pressure reactor was 870 ppm.

Example 8

The polymerization took place in the same way as described in example 7, with the difference that the fractions of alkanesulfonate sodium salt (Mersolat) and dodecylbenzenesulfonic acid sodium salt (Melon) in the emulsifier feed was raised to 35 g of Mersolat and 49 g of Melon, and the fraction of the isotridecyl alcohol polyglycol ether having a degree of ethoxylation of 15 (Genapol X150) was reduced to 200 g. The weight fraction of ionic emulsifiers was therefore 30% by weight, based on the total weight of emulsifier. The polymerization was carried out over a period of 24 hours.

The dispersion obtained had a solids content of 55.7% by weight, a viscosity of 1260 mPas (Brookfield, 20, 23° C.) and a glass transition temperature of 6.0° C. The median of the weight-average particle size distribution Dw of the dispersion was 660 nm and was stable over the duration of the reaction. The conversion rate, based in each case on the total weight of the monomers used in the process, was 60.4% by weight in pressure reactor R1 and 97.3% by weight in pressure reactor R2. The residual monomer content in the low-pressure reactor was 720 ppm.

Comparative Example 9

The polymerization took place in the same way as described in example 7, with the difference that the fractions of alkanesulfonate sodium salt (Mersolat) and dodecylbenzenesulfonic acid sodium salt (Melon) in the emulsifier feed were raised to 70 g of Mersolat and 90 g of Melon, and the fraction of the isotridecyl alcohol polyglycol ether having a degree of ethoxylation of 15 (Genapol X150) was reduced to 130 g. The weight fraction of ionic emulsifiers was therefore 55% by weight, based on the total weight of emulsifier. The polymerization was carried out over a period of 24 hours.

The dispersion obtained had a solids content of 55.9% by weight, a viscosity of 660 mPas (Brookfield, 20, 23° C.), and a glass transition temperature of 7.0° C. The median of the weight-average particle size distribution Dw of the dispersion was 1120 nm and was stable over the duration of the reaction. The conversion rate, based in each case on the total weight of the monomers used in the process, was 59.1% by weight in pressure reactor R1 and 96.0% by weight in pressure reactor R2. The residual monomer content in the low-pressure reactor was 860 ppm.

Example 10

The polymerization took place in the same way as described in comparative example 6, with the difference that the emulsifier feed into the pressure reactor R2 was reduced from 880 g/h of the emulsifier mixture described therein to 440 g/h, and the remaining 440 g/h were metered together with the metered feed of 3000 g/h into the reactor R1. The polymerization was carried out over a period of 24 hours. The fraction of the emulsifiers metered into the pressure reactor was therefore 11% by weight, based on the total weight of the emulsifiers.

The dispersion obtained had a solids content of 56.5% by weight, a viscosity of 1420 mPas (Brookfield, 20, 23° C.), and a glass transition temperature of 5.3° C. The median of the weight-average particle size distribution Dw of the dispersion was 660 nm and was stable over the duration of the reaction. The conversion rate, based in each case on the total weight of the monomers used in the process, was 61.6% by weight in pressure reactor R1 and 93.6% by weight in pressure reactor R2. The residual monomer content in the low-pressure reactor was 880 ppm.

Example 11

The polymerization took place in the same way as described in example 7, with the difference that in the emulsifier mixtures metered into the pressure reactors R1 and R2, the polyvinyl alcohol fraction had been omitted. The polymerization was carried out over a period of 24 hours.

The dispersion obtained had a solids content of 56.1% by weight, a viscosity of 45 mPas (Brookfield, 20, 23° C.) and a glass transition temperature of 6.0° C. The median of the weight-average particle size distribution Dw of the dispersion was 670 nm and was stable over the duration of the reaction. The conversion rate, based in each case on the total weight of the monomers used in the process, was 63.3% by weight in pressure reactor R1 and 94.0% by weight in pressure reactor R2. The residual monomer content in the low-pressure reactor was 730 ppm.

Performance Testing

Production of the Paint Formulations:

Paints based on different formulations were produced using the dispersions described in (comparative) examples 1 to 11. Formulation 1 describes a conventional formulation having a PVC of 56% (table 1). Formulation 2 describes a silicate-rich formulation (silicate/carbonate=180/43 parts by weight (having a PVC of 60%, while formulation 3 represents a carbonate-rich formulation (silicate/carbonate=80/260 parts by weight) having a PVC of 73% (tables 2 and 3).

TABLE 1

Paint formulation 1
Paint formulation 1 (PF1)

| Constituent | weight fraction |
|---|---|
| water | 285.5 |
| cellulose ether (Natrosol plus 330) | 5 |
| rheological additive (Rheolate 208) | 1 |
| dispersant (Dispex G 40) | 3.5 |
| defoamer (Silfoamer SD670) | 2 |
| sodium hydroxide (10% in water) | 1 |
| preservative (Hydorol W) | 2 |
| titanium dioxide pigment (Kronos 2300) | 220 |
| calcium carbonate (Omyalite 90) | 200 |
| polymer dispersion (55%) | 280 |
| Sum of all parts by weight | 1000 |

TABLE 2

Paint formulation 2
Paint formulation 2 (PF2)

| Constituent | weight fraction |
|---|---|
| water | 300 |
| cellulose ether (Tylose H 6000 YP) | 6 |
| dispersant (Dispex N 40) | 5 |
| dispersant (Calgon N) | 5 |
| sodium hydroxide (10% in water) | 1 |
| preservative (Hydorol W) | 1 |
| defoamer (Agitan 260) | 4 |
| magnesium silicate (Talkum N) | 30 |
| titanium dioxide pigment (Kronos 2300) | 250 |
| aluminum silicate, precipitated (P 820) | 50 |
| aluminum silicate (China clay B) | 100 |
| calcium carbonate, precipitated (Socal P2) | 13 |
| dolomite (Microdol 1) | 30 |
| polymer dispersion (55%) | 200 |
| defoamer (Agitan 260) | 5 |
| Sum of all parts by weight | 1000 |

TABLE 3

Paint formulation 3
Paint formulation 3 (PF3)

| Constituent | weight fraction |
|---|---|
| water | 423 |
| cellulose ether (Tylose H 6000 YP) | 6 |
| dispersant (Dispex N 40) | 5 |
| dispersant (Calgon N) | 5 |

TABLE 3-continued

Paint formulation 3
Paint formulation 3 (PF3)

| Constituent | weight fraction |
|---|---|
| sodium hydroxide (10% in water) | 1 |
| preservative (Hydorol W) | 1 |
| defoamer (Agitan 260) | 4 |
| magnesium silicate (Talkum N) | 80 |
| titanium dioxide pigment (Kronos 2300) | 100 |
| calcium carbonate (Omyacarb 2 GU) | 70 |
| calcium carbonate (Omyacarb 5 GU) | 70 |
| calcium carbonate, precipitated (Socal P2) | 70 |
| dolomite (Microdol 1) | 50 |
| polymer dispersion (55%) | 110 |
| defoamer (Agitan 260) | 5 |
| Sum of all parts by weight | 1000 |

Determination of the Wet Abrasion:

Using all three formulations, the wet abrasion resistance was tested by means of the abrasive pad method (ISO11998). This was done by determining the erosion of the coating after 200 scrub cycles, via the loss of mass by the paint film. From the paint density, the scuffed area, and the loss of mass of the paint film, a calculation was made of the paint erosion (wet abrasion) in μm. The results are compiled in tables 4 and 5.

Determination of the Median of the Weight-Average Particle Size Distribution:

The median value of the weight-average particle size distribution was determined by static light scattering measurement using the LS13320 particle size measuring instrument from BECKMAN COULTER™. The sample is diluted with water to a concentration of approximately 2% by weight and subjected to measurement in PIDS (polarization intensity differential scattering) mode. With this method it is possible to measure particle size distributions in the range from 40 nm to 2000 μm. The measuring time per sample is around 1.5 minutes.

The median of the particle size distribution divides the distribution into two halves of equal size: 50% by weight of the particles in the distribution lie above, and 50% by weight below, the median value.

TABLE 4

Median of the weight-average particle size distribution of the dispersions from (comparative) example 1 to 5 and wet abrasion resistance (WA) of the paint formulations 1 and 2 produced with binder from (comparative) examples 1 to 5.

| Example | Weight fractions VTMS/GMA [%] | Weight fractions PVOH [%] | Weight fractions emulsifier [%] | Median [nm] | WA PF 1 [μm] | WA PF 2 [μm] |
|---|---|---|---|---|---|---|
| C1 | 0/0 | 7 | 0 | 1300 | 9.6 | 17.5 |
| 2 | 0/0 | 0 | 5.5 *) | 780 | 5.9 | 14.6 |
| 3 | 0/0 | 1.2 | 5.5 *) | 790 | 5.8 | 13.8 |
| C4 | 0/0 | 1.2 | 5.5 | 1000 | 6.2 | 15.9 |
| C5 | 0/0 | 1.2 | 5.5 **) | 1010 | 9.5 | 17.1 |

TABLE 5

Median of the weight-average particle size distribution of the dispersions from (comparative) example 6 to 11 and wet abrasion resistance (WA) of the paint formulations 2 and 3 produced with binder from (comparative) examples 6 to 11.

| Example | Weight fractions VTMS/GMA [%] | Weight fractions PVOH [%] | Weight fractions emulsifier [%] | Median [nm] | WA PF 1 [μm] | WA PF 2 [μm] |
|---|---|---|---|---|---|---|
| C6 | 0.7/1.0 | 1.2 | 5.5 | 1630 | 8.8 | 36.9 |
| 7 | 0.7/1.0 | 1.2 | 5.5 *) | 600 | 4 | 15.3 |
| 7 | 0.7/1.0 | 1.2 | 5.5 *) | 660 | 6.3 | 29.8 |
| C9 | 0.7/1.0 | 1.2 | 5.5 *) **) | 1120 | 9.7 | 37.8 |
| 10 | 0.7/1.0 | 1.2 | 5.5 ***) | 660 | 5.8 | 29.3 |
| 11 | 0.7/1.0 | 0 | 5.5 *) | 670 | 6.9 | 18.8 |

Key to Tables 4 and 5:
TMS=vinyltrimethoxysilane,
GMA=glycidyl methacrylate,
PVOH=polyvinyl alcohol, median=median of the weight average particle size distribution,
WA=wet abrasion, PF=paint formulation
*) Emulsifier metered exclusively into the first reactor
**) the fraction of ionic emulsifiers, based on the total weight of all emulsifiers used, >50% by weight
***) the fraction of ionic emulsifiers, based on the total weight of all emulsifiers used is 10% by weight Discussion of the Results from Table 4:

The results of the examples and comparative examples show that the supplying of the surface-active compounds and their composition have a decisive influence on the particle size of the polymer particles. The examples and comparative examples without the use of vinyltrimethoxysilane and glycidyl methacrylate ((comparative) examples 1 to 5) exhibit a marked reduction in the weight-average particle size distribution when at least 80% by weight of the total amount of all the emulsifiers supplied were metered continuously into the first pressure reactor (example 2 and example 3). The decrease in the particle size of the polymer dispersion goes hand in hand with a marked decrease in the wet abrasion of the paint formulations (example 2 and example 3). Where, in contrast, as in comparative example 4, less than 80% of the emulsifier is supplied to the first pressure reactor, the wet abrasion is impaired significantly for the same composition of the emulsifier mixture.

Example 3 in comparison to example 2 shows the positive effect of the stabilizer combination with protective colloid.

In contrast, the exclusive use of protective colloid, as in comparative example 1, brings only unsatisfactory results in terms of particle size and wet abrasion.

If, as in comparative example 5, less than 50% by weight of nonionic emulsifier is used in the emulsifier mixture, particle size and wet abrasion are likewise impaired.

Discussion of the Results from Table 5:

Similar effects can also be observed for the functionalized polymer dispersions synthesized continuously using vinyltrimethoxysilane and glycidyl methacrylate ((comparative) examples 6 to 10). The inventive supplying of the emulsifiers, as described in example 7, led to a weight-average particle size distribution of well below 800 nm and to a reduction in the wet abrasion in both paint formulations. In comparison thereto, the division of the metered feed of the emulsifiers and protective colloids, with less than 80% by weight in the first pressure reactor, led to a significant shift in the median of the weight-average particle size distribution to values of more than 800 nm and to an associated increase in the wet abrasion of the paint formulations (comparative example 6).

An optimum in terms of properties is obtained when, in addition to the metering of at least 80% by weight of the emulsifier into the first pressure reactor, the selected fraction of nonionic emulsifiers in the emulsifier feed is as high as possible. This is shown by the comparison of example 8 (70% by weight nonionic emulsifier) with example 7 (79% by weight nonionic emulsifier).

In the same way as for the measurements with unfunctionalized copolymers, particle size and wet abrasion are impaired with less than 50% by weight of nonionic emulsifier in the emulsifier mixture (comparative example 9).

The comparison of example 11 with example 7 shows the positive influence of costabilization with protective colloid. The values for the median and wet abrasion are very good for example 11 (without polyvinyl alcohol), but can be increased further by costabilization with polyvinyl alcohol, as in example 7.

In example 10, in contrast to comparative example 6, more than 80% by weight of the emulsifier was metered into the first pressure reactor. This leads to an improvement in the values, but not to the same extent as with exclusive metering of the emulsifier into the first pressure reactor (example 7).

Accordingly, with the procedure of the invention, it is possible to produce a profile of properties for the polymer dispersion that is comparable with that of dispersions produced by the conventional batch and semibatch regimes, also in terms of the performance properties of the paints resulting therefrom.

The wet abrasion, surprisingly, is not only influenced solely by addition of the crosslinking monomers vinyltrimethoxysilane and glycidyl methacrylate, but instead can also be controlled via the metered amounts of the emulsifiers and optionally protective colloids. Moreover, it was found, surprisingly, that the fraction of ionic emulsifier must be selected at not >50% by weight, in order to maintain acceptable wet abrasion.

The invention claimed is:

1. A process for the aqueous, radically initiated, continuous emulsion polymerization of A) at least one vinyl ester and optionally at least one (meth)acrylic ester, B) ethylene, and C) 0% to 10% by weight, based on the total weight of the monomers, of one or more ethylenically unsaturated, functionalized comonomers, in the presence of 3.0% to 12.5% by weight, based on the total weight of the monomers, of a mixture of one or more nonionic emulsifiers and one or more anionic emulsifiers, where at least 50% by weight, based on the total weight of emulsifiers, are nonionic emulsifiers, and 0% to 10% by weight, based on the total weight of the monomers, of one or more protective colloids, in a stirred-tank cascade with at least two serial pressure reactors and downstream therefrom at least one low-pressure reactor, where polymerization takes place in the pressure reactors at a temperature of 50° C. to 90° C. under a pressure of 10 to 90 bar abs., and the polymerization is conducted such that at least 80% by weight of the total weight of emulsifiers is metered in the first pressure reactor, and at least 50% by weight each of the total weight of comonomer A) and comonomer B) is added in the first pressure reactor, the remaining amounts of the monomers A) and B) are added in the following pressure reactors, and the polymerization in the first pressure reactor is conducted through to a monomer conversion of ≥30% by weight, based on the total amount of the monomers used in the process, and in the last pressure reactor it is conducted through to a monomer conversion of ≥90% by weight, based on the total weight of the monomers used in the process, and polymerization to completion takes place in the at least one low-pressure reactor at a temperature of 30° C. to 60° C. under a pressure of not more than 4 bar abs.

2. The process of claim 1, wherein one or more comonomers C) from the group consisting of ethylenically unsaturated, hydrolyzable silicon compounds and ethylenically unsaturated compounds containing epoxide groups are copolymerized.

3. The process of claim 2, wherein 0.05% to 5% by weight of at least one ethylenically unsaturated, hydrolyzable silicon compound and/or 0.1% to 5% by weight of at least one ethylenically unsaturated compound containing epoxide groups, based in each case on the total weight of the monomers, are copolymerized.

4. The process of claim 2, wherein one or more comonomers C) from the group consisting of γ-acryloyl- and γ-methacryloyloxypropyltri(alkoxy)silanes, having C1 to C12 alkoxy groups and optionally C1 to C3 alkyl groups, and α-silanes are copolymerized.

5. The process of claim 2, wherein one or more comonomers C) from the group consisting of glycidyl acrylate, glycidyl methacrylate, allyl glycidyl ether, and vinyl glycidyl ether are copolymerized.

6. The process of claim 1, wherein further to the monomers A) and B) and optionally C), 0.05% to 10% by weight, based on the total weight of the monomers, of auxiliary monomers D) are copolymerized.

7. The process of claim 6, wherein copolymerized auxiliary monomers D) comprise one or more compounds from the group consisting of ethylenically unsaturated monocarboxylic and dicarboxylic acids, ethylenically unsaturated carboxamides and carbonitriles, ethylenically unsaturated sulfonic acids, and salts thereof.

8. The process of claim 1, wherein comonomers A) copolymerized comprise, further to vinyl ester, up to 20% by weight, based on the total weight of the monomers, of methacrylic esters or acrylic esters of unbranched or branched alcohols having 1 to 15 C atoms.

9. The process of claim 1, wherein vinyl acetate in an amount of 70% to 90% by weight and ethylene in an amount of 1% to 30% by weight of ethylene, based in each case on the total weight of the monomers, are copolymerized.

10. The process of claim 1, wherein the fraction of the nonionic emulsifiers in the mixture is at least 75% by weight, based on the total weight of nonionic and anionic emulsifier.

11. The process of claim 1, wherein further to the emulsifiers, protective colloids are used as surface-active compounds.

12. The process of claim 11, wherein polyvinyl alcohol is used as protective colloid.

13. The process of claim 1, wherein polymerization to completion takes place in the low-pressure reactor through to a free monomer content 1000 ppm.

14. The process of claim 1, wherein volatile residual monomers are removed in the low-pressure reactor by means of distillation and optionally with inert entraining gases being passed through or over the reactor contents.

15. The process of claim 1, wherein the total amount of emulsifier and optionally protective colloid is metered in the first pressure reactor.

* * * * *

UNITED STATES PATENT AND TRADEMARK OFFICE

CERTIFICATE OF CORRECTION

PATENT NO. : 8,822,572 B2
APPLICATION NO. : 13/505921
DATED : September 2, 2014
INVENTOR(S) : Jessica Hain et al.

It is certified that error appears in the above-identified patent and that said Letters Patent is hereby corrected as shown below:

In the Claims,

At Column 22, line 56, "a free monomer content 1000 ppm" should read --a free monomer content ≤ 1000 ppm--

Signed and Sealed this
Second Day of December, 2014

Michelle K. Lee
*Deputy Director of the United States Patent and Trademark Office*